United States Patent
Ebbrecht et al.

(10) Patent No.: US 6,433,028 B1
(45) Date of Patent: *Aug. 13, 2002

(54) USE OF WATER-INSOLUBLE POLYOXYALKYLENE-POLYSILOXANE BLOCK COPOLYMERS FOR DEFOAMING AQUEOUS MEDIA

(75) Inventors: Thomas Ebbrecht, Bochum; Wolfgang Josten, Königswinter; Michael Keup, Essen; Stefan Silber, Krefeld; Roland Sucker, Werne, all of (DE)

(73) Assignee: Goldschmidt AG, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,901

(22) Filed: May 11, 2000

(30) Foreign Application Priority Data

May 14, 1999 (DE) .......................................... 199 22 352

(51) Int. Cl.$^7$ ..................... B01D 19/04; C10M 139/04; C08K 5/5419; C09D 11/00
(52) U.S. Cl. ..................... 516/118; 516/119; 516/121; 516/124; 508/208; 524/188; 524/267; 524/588; 106/31.25
(58) Field of Search ................................ 516/124, 116, 516/118, 119, 121; 524/588, 837, 838, 267, 188; 556/410, 426, 445, 446; 508/126, 208; 106/31.25; 162/164.4

(56) References Cited

U.S. PATENT DOCUMENTS

| | | | |
|---|---|---|---|
| 2,846,458 A | | 8/1958 | Haluska ..................... 516/118 |
| 3,402,192 A | | 9/1968 | Haluska ..................... 556/445 |
| 3,763,021 A | | 10/1973 | Householder ............... 516/123 |
| 4,130,708 A | * | 12/1978 | Friedlander et al. ......... 528/29 |
| 4,605,712 A | * | 8/1986 | Mueller et al. ............... 528/29 |
| 4,769,174 A | * | 9/1988 | Kilgour ....................... 516/906 |
| 4,906,707 A | * | 3/1990 | Yukimoto et al. ............ 528/25 |
| 6,001,887 A | * | 12/1999 | Keup et al. ................. 516/118 |
| 6,162,888 A | * | 12/2000 | Lee et al. ..................... 528/25 |

FOREIGN PATENT DOCUMENTS

| | | |
|---|---|---|
| DE | 1 012 602 | 7/1957 |
| DE | 1 165 028 | 9/1964 |

OTHER PUBLICATIONS

Koczo et al., "Mechanisms for Antifoaming Action in Aqueous Systems by Hydrophobic Particles and Insoluble Liquids", Journal of Colloid and Interface Science, 166, pp. 225–238, 1994 Month unknown.

William C. Griffin, "Calculation of HLB Values of Non–ionic Surfactants", The Journal of the Society of Cosmetic Chemists, vol. V., No. 4, pp. 249–256, Dec. 1954.

* cited by examiner

*Primary Examiner*—Daniel S. Metzmaier
(74) *Attorney, Agent, or Firm*—Frommer Lawrence Haug LLP

(57) ABSTRACT

The invention relates to the use of water-insoluble polyoxyalkylene-polysiloxane block copolymers of the general average formula

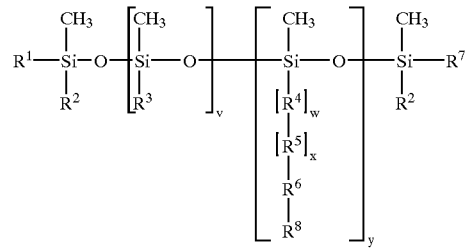

wherein the variables and indices are described herein as defoaming agents for aqueous media. This invention also provides for defoaming compositions comprising said water-insoluble polyoxyalkylene-polysiloxane block copolymers as well as coating materials, printing inks and cooling lubricants containing the inventive defoaming compositions.

18 Claims, No Drawings

USE OF WATER-INSOLUBLE POLYOXYALKYLENE-POLYSILOXANE BLOCK COPOLYMERS FOR DEFOAMING AQUEOUS MEDIA

RELATED APPLICATIONS

This application claims priority to German Application 199 22 352.1, filed May 14, 1999, herein incorporated by reference.

BACKGROUND OF THE INVENTION

1. Field of the Invention

The invention relates to the use of water-insoluble polyoxyalkylene-polysiloxane block copolymers for defoaming aqueous media.

In numerous industrial processes, aqueous formulations use surface-active substances in order, for example, to emulsify water-insoluble substances or to reduce the interfacial tension and so achieve better wetting characteristics. An unwanted accompanying effect of these surface-active substances, however, is that air introduced during the preparation and processing of such water-based formulations is stabilized as foam. Examples of processes in which such problems occur include papermaking, wastewater treatment, emulsion polymerization, and the manufacture and application of water-dilutable coating systems.

Foam of this kind, produced in the course of stirring or dispersing operations during manufacture or filling, prolongs production times and reduces the effective capacity of the production plant. Foam is disruptive to the application of coating materials since it leads to unwanted surface defects. As a result, the use of antifoams or defoamers in virtually all water-based systems is widespread and often indispensable.

In the past, a large number of formulations have been described which envisage the use of, for example, silicone oils, organomodified siloxanes, hydrophobic polyoxyalkylenes, mineral oils, natural oils and other hydrophobic liquids as defoaming substances. Frequently, the above-mentioned substances are used in combination with hydrophobic solids, such as silicas, metal stearates or fatty acid amides, for example, which often intensify the foam inhibiting or defoaming effect.

In accordance with the present state of knowledge, it is critical to the defoaming action of a defoamer that it is able to penetrate into the foam lamellae and so to weaken them until they collapse (cf. K. Koczo, J. K. Koczone, D. T. Wasan, J. Colloid Interface Sci. 166, 225–238 (1994)). To achieve this requires a controlled incompatibility (hydrophobicity) with the aqueous phase to be defoamed: if a defoamer is too compatible (hydrophilic), it will not be able to be very effective since it does not penetrate preferentially into the foam lamella. If the degree of incompatibility is too great, then defoaming is generally very good but there are frequently the unwanted side effects of surface defects, deterioration in wetting characteristics, and separation phenomena.

Consequently, the search for a suitable defoamer is always a search for the correct incompatibility/compatibility balance for the system to be defoamed, with the aim of getting as close as possible to the target hydrophobicity/hydrophilicity equilibrium.

2. Description of the Related Art

In the past, polyoxyalkylene-polysiloxane block copolymers have proven suitable for allowing this equilibrium to be established in a particularly variable manner, as is described, inter alia, in U.S. Pat. No. 3,763,021.

When polyoxyalkylene-polysiloxane block copolymers are used, advantage is taken of the fact that the polysiloxane blocks can be modified in a targeted manner with polyoxyalkylene units which, by virtue of their composition from hydrophilic and hydrophobic polyoxyalkylene units, can be adapted, in interplay with the polysiloxane block, to the abovementioned desired hydrophobicity/hydrophilicity equilibrium.

The prior art, an example of which that may be mentioned here is DE-C-1 012 602, includes polyoxyalkylene-polysiloxane block copolymers in which the polyoxyalkylene block is defined as $(C_nH_{2n},O)_x$. The index n is an integer from 2 to 4, it being essential that these polyoxyalkylene blocks always include —$CH_2$—CHR—O— groups as a common structural element, R being a hydrogen atom, a methyl group or an ethyl group. Such polyoxyalkylene blocks are prepared by ionic addition polymerization of oxirane derivatives, such as ethylene oxide, propylene oxide and butylene oxide. The basic structure of the properties-determining polyoxyalkylene chain is distinguished, however, by generally the combination of only two different polyoxyalkylene units in a polyoxyalkylene chain. Typically, polyoxyethylenes and polyoxypropylenes are used in the polyoxyalkylene-polysiloxane block copolymers of the prior art.

By varying the oxyalkylene units, and in particular by modifying their respective proportions and their sequence in the polymer (random and/or in blocks), a large number of polyoxyalkylene-polysiloxane block copolymers are obtainable.

Because of the restriction to only two polyoxyalkylene units, however, in many cases it has not been possible to date to find the optimum incompatibility/compatibility balance required for certain defoamers, and especially not when their random distribution is permitted.

OBJECT OF THE INVENTION

It is therefore an object of the present invention to provide particularly suitable polyoxyalkylene-polysiloxane block copolymers for defoaming aqueous media, said copolymers making it possible to establish the above-described desired incompatibility/compatibility balance in a targeted manner better than has been possible to date.

SUMMARY OF THE INVENTION

This object is surprisingly achieved by the use of water-insoluble polyoxyalkylene-polysiloxane block copolymers of the general average formula I:

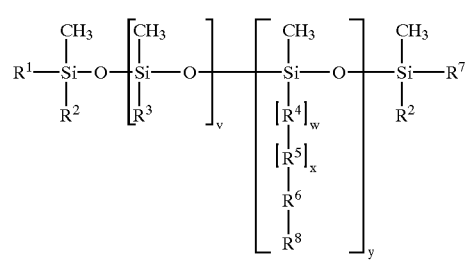

where $R^1$ and/or $R^7$ are $R^2$ or —$[R^4]_w$—$[R^5]_x$—$[R^6]$—$R^8$, $R^2$ and $R^3$ are identical or different alkyl radicals, preferably having 1 to 24 carbon atoms or are unsubstituted or substituted aryl radicals, preferably having up to 24 carbon atoms, with phenyl especially preferred, $R^4$ is a divalent radical of the formula —O—, —NH—, —NR²— or —S— or of the formula —[O—Si(CH₃)₂]ᵤ—, where u is from 2 to 200, $R^5$ is identical or different alkylene radicals, preferably having 1 to 24 carbon atoms, or is —$C_nH_{2n-f}R^2_f$—O—$C_mH_{2m-g}R^2_g$—, where
f is from 0 to 12,
g is from 0 to 12,
n is from 1 to 18,
m is from 1 to 18, $R^6$ is identical or different radicals of the general formula

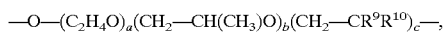
—O—(C₂H₄O)ₐ(CH₂—CH(CH₃)O)ᵦ(CH₂—CR⁹R¹⁰)ᵧ—, where
$R^9$ and $R^{10}$ are a methyl radical or
$R^9$ is a hydrogen atom and $R^{10}$ is an ethyl radical, but where, taking into account all radicals $R^6$, the proportion of C₂H₄O groups among the total of all radicals $R^6$ does not exceed 40% by weight,
a is from 2 to 30,
b is from 2 to 50,
c is from 2 to 40, and
the sum (a+b+c) is from 6 to 100 and the sequence of the individual polyoxyalkylene segments —(C₂H₄O)ₐ— and —(CH₂—CH(CH₃)O)ᵦ— and —(CH₂—CR⁹R¹⁰O)ᵧ— can be as desired and, in particular, embraces block copolymers, such as random polymers and combinations thereof, $R^8$ is a hydrogen, a substituted or unsubstituted alkyl radical, preferably having 1 to 6 carbon atoms, or an acyl radical,
v is from 3 to 200,
w is 0 or 1,
x is 0 or 1,
y is from 0 to 200,
and, if y is 0, $R^1$ and/or $R^7$ are/is —[R⁴]_w—[R⁵]_x—[R⁶]—R⁸ for defoaming aqueous media.

In many cases, polyoxyalkylene-polysiloxane block copolymers which have proven highly suitable are those obtained by means of combinations of two or more polyoxyalkylene units with one or more polysiloxane copolymers. In that case, the distinction in the case of the polyoxyalkylene copolymers can be a distinction in relation either to the relative proportion of the units used for the preparation of this copolymer or to the molecular weight of the whole polyoxyalkylene unit, or else can lie in its functionality.

Different polysiloxane copolymers can be distinguished in accordance with both their molecular mass and their degree of branching or the number and/or relative position of the reactive groups used which are available for linkage.

The mode of action of the compounds of the invention is expressly not that they bring about particularly good compatibilization between constituents of a mixture that differ in polarity. Rather, it is the case that they themselves are just compatible enough not to induce any unwanted side effects such as surface defects, deteriorations in the wetting characteristics, or separation phenomena, but without bringing about the compatibilization of other constituents.

For the present invention it is essential that the polyoxyalkylene-polysiloxane block copolymers of the invention are not water-soluble. This means that a 1:1 mixture (% by weight) with water leads to a nonhomogeneous mixture of the two phases and that no dissolving of the polyoxyalkylene-polysiloxane block copolymers of the invention takes place. However, small fractions of free polyoxyalkylenes may be present in the polyoxyalkylene-polysiloxane block copolymers as a result of their preparation, as set out below. Since the preparation of these copolymers essentially obeys the laws of statistics, it is also possible for particularly oxyethylene-rich polyoxyalkylenes to occur, which in turn may be soluble in water. These fractions, however, are very small and in the polyoxyalkylene-polysiloxane block copolymers of the invention are always less than 10% by weight.

The polyoxyalkylene-polysiloxane block copolymers of the invention can be prepared in accordance with customary methods as in the prior art. As the skilled worker is well aware, such methods include in particular the hydrosilylation reaction of additionally olefinically unsaturated polyoxyalkylenes with hydropolysiloxanes, as described for example in U.S. Pat. No. 3,402,192, or the nucleophilic substitution of polyoxyalkylenes with nucleophilic groups on polysiloxanes containing at least one silicon atom substituted by an electronegative group (cf., for example, DE-B-11 65 028). Processes of this kind and the preparation of appropriate polysiloxanes are further described, moreover, for example, in W. Noll "Chemie und Technologie der Silicone", Verlag Chemie, Weinheim, 1968.

In accordance with the prior art, the polyoxyalkylenes required for this purpose can be obtained by ionic polymerization of ethylene oxide, propylene oxide, n-butylene oxide, and isobutylene oxide.

EXAMPLES

In order to illustrate the claimed compounds, the following polysiloxanes 1 to 3 were reacted, by way of example, with the polyoxyalkylenes 1 to 8:

TABLE 1

| | |
|---|---|
| Polysiloxane 1 | (CH₃)₃SiO—[(CH₃)₂SiO—]₂₀[(CH₃)HSiO—]₅Si(CH₃)₃ |
| Polysiloxane 2 | (CH₃)₂HSiO—[(CH₃)₂SiO—]₃₀[(CH₃)HSiO—]₄SiH(CH₃)₂ |
| Polysiloxane 3 | (CH₃)₂ClSiO—[(CH₃)₂SiO—]₁₃SiCl(CH₃)₂ |
| Polyoxy-alkylene 1 | H₂C=CH—CH₂O—(C₂H₄O—)₄(CH₂CH(C₂H₅)O)₈H |
| Polyoxy-alkylene 2 | H₂C=CH—CH₂O—(C₂H₄O—)₄(CH₂CH(CH₃)O—)₁₈H |
| Polyoxy-alkylene 3 | H₂C=CH—CH₂O—(CH₂CH(CH₃)O—)₁₀(CH₂CH(C₂H₅)O)₆H |
| Polyoxy-alkylene 4 | H₂C=CH—CH₂O—(C₂H₄O—)₁₂(CH₂CH(CH₃)O—)₄(CH₂CH(C₂H₅)O)₂H |
| Polyoxy-alkylene 5 | H₂C=CH—CH₂O—(C₂H₄O—)₄(CH₂CH(CH₃)O—)₁₀(CH₂CH(C₂H₅)O)₆H |

TABLE 1-continued

| | |
|---|---|
| Polyoxyalkylene 6 | $H_3C-CH_2-CH_2-CH_2O-(C_2H_4O-)_4(CH_2CH(CH_3)O-)_{18}H$ |
| Polyoxyalkylene 7 | $H_3C-CH_2-CH_2-CH_2O-(C_2H_4O-)_{12}(CH_2CH(CH_3)O-)_4(CH_2CH(C_2H_5)O)_2H$ |
| Polyoxyalkylene 8 | $H_3C-CH_2-CH_2-CH_2O-(C_2H_4O-)_4(CH_2CH(CH_3)O-)_{10}(CH_2CH(C_2H_5)O)_6H$ |

The skilled worker is well aware that the compounds are obtained in the form of mixtures of their homologs and that the indices stated denote average values.

In accordance with the Table below, the following polyoxyalkylene-polysiloxane block copolymers were obtained:

TABLE 2

| Example | Siloxane | Polyoxyalkylene (eq %) | (eq %) | Inventive yes/no |
|---|---|---|---|---|
| 1 | 1 | 1 (100) | — | no |
| 2 | 1 | 2 (100) | — | no |
| 3 | 1 | 3 (100) | — | no |
| 4 | 1 | 4 (100) | — | no |
| 5 | 1 | 5 (100) | — | yes |
| 6 | 2 | 1 (100) | — | no |
| 7 | 2 | 2 (100) | — | no |
| 8 | 2 | 3 (100) | — | no |
| 9 | 2 | 4 (100) | — | no |
| 10 | 2 | 5 (100) | — | yes |
| 11 | 2 | 5 (50) | 4 (50) | yes |
| 12 | 3 | 6 (100) | — | no |
| 13 | 3 | 7 (100) | — | no |
| 14 | 3 | 8 (100) | — | yes |
| 15 | 3 | 8 (50) | 7 (50) | yes |

Examples 1 to 11 were prepared in accordance with processes customary from the literature as described, for example, in DE-B-11 65 028; Examples 2 to 15 were prepared in accordance with processes customary from the literature as described, for example, in U.S. Pat. No. 2,846,458.

The skilled worker is well aware that with this mode of preparation, corresponding to the prior art, it is possible for free polyoxyalkylene still to be present in the polyoxyalkylene-polysiloxane block copolymers. As a general rule, this is not disruptive and need not be removed for the subsequent use of the compounds.

For use as defoamers, the water-insoluble polyoxyalkylene-polysiloxane block copolymers of the invention are advantageously formulated as follows:
a) from 72 to 85% by weight of the polyoxyalkylene-polysiloxane block copolymers,
b) from 15 to 28% by weight of a nonionic ethoxylate having a HLB of from 8 to 12, and
c) from 0.1 to 10% by weight, based on the sum a)+b), of an organic or inorganic solid substance.

Examples of nonionic ethoxylates having a HLB (hydrophilic/lipophilic balance; definition as per W. C. Griffin; J. Soc. Cosmet. Chem., Volume 5, page 249, 1954) of 8–12 are fatty acid esters of polyvalent alcohols, the polyethylene glycol derivatives thereof, polyglycol derivatives of fatty acids and fatty alcohols, alkylphenol ethoxylates, and block copolymers of ethylene oxide and propylene oxide (Pluronics). Preference is given to ethoxylates of raw materials obtainable from naturally occurring fats, especially oleyl derivatives and stearyl derivatives.

Examples of the organic or inorganic solid substances are silicas, alumina, alkaline earth metal carbonates, alkaline earth metal salts of long chain fatty acids, the amides thereof, and urea derivatives. These substances may also have been additionally hydrophobicized in accordance with known methods.

The formulated defoamers described above can be used as they are or in the form of their aqueous emulsion. Emulsions are frequently used with preference since they are easier to meter. Particular preference is given to defoamer emulsions whose average particle diameter lies between 1 and 10 $\mu$m. Such emulsions then contain between 5 and 50% by weight of the water-insoluble polyoxyalkylene-polysiloxane block copolymers of the invention.

Performance testing takes place in emulsion paints to which defoamer is added conventionally in amouts of from 0.01 to 0.5% by weight based on the emulsion paint.

The following formulations were prepared and tested:

TABLE 3

| Formulation | Polyoxyalkylene-polysiloxane block copolymer from Example | Inventive yes/no |
|---|---|---|
| 1 | 1 | no |
| 2 | 2 | no |
| 3 | 3 | no |
| 4 | 4 | no |
| 5 | 5 | yes |
| 6 | 6 | no |
| 7 | 7 | no |
| 8 | 8 | no |
| 9 | 9 | no |
| 10 | 10 | yes |
| 11 | 11 | yes |
| 12 | 12 | no |
| 13 | 13 | no |
| 14 | 14 | yes |
| 15 | 15 | yes |

The compositions of formulations 1 to 15 are as follows:
75% by weight polyoxyalkylene-polysiloxane block copolymer as per Example 1 to 15
20% by weight oleyl ethoxylate with a HLB of 10
5% by weight silica Testing was carried out in the following emulsion paints:

Emulsion paint 1
(all amounts in % by weight)

| | | |
|---|---|---|
| Propylene glycol | 4.7 | |
| Collacral ® AS 35 | 5.0 | BASF |
| (polyacryalate dispersing agent) | | |
| Titanium dioxide | 23.1 | |
| Mergal ® K7 | 0.2 | Riedel de Haen |
| (formaldehyde-free preservative) | | |
| Butyl glycol | 2.6 | |
| Dowanol ® DPM | 1.3 | Dow |
| (dipropylene glycol methyl ether) | | |
| Water | 6.8 | |

-continued

| | | |
|---|---|---|
| Acronal ® A603 (acrylate dispersion) | 52.3 | BASF |
| Rheolate ® 278 (polyurethane-based thickner) | 4.0 | Rheox |
| Emulsion paint 2 (all amounts in % by weight) | | |
| Water | 36.4 | |
| Coatex ® P50 (polyurethane-based thickner) | 0.4 | Coatex |
| Calgon ® N (sodium polyphosphate) | 0.1 | BK Ladenburg |
| Mergal ® K7 (formaldehyde-free preservative) | 0.2 | Riedel de Haen |
| Coatex ® BR100 (polyurethane-based thickener) | 2.3 | Coatex |
| Calcidar ® Extra (calcium carbonate) | 22.1 | Omya |
| Titanium dioxide | 17.5 | |
| Finntalc ® M15 (talcum) | 4.7 | Finnchemicals |
| NaOH, 10% | 0.1 | |
| Acronal ® 290D (Styrene acrylate dispersion) | 16.2 | BASF |

The emulsion paints were formulated in accordance with the prior art. All raw materials were used without further purification. To end, 0.06% by weight of defoamer (formulation 1 to 15) was added and was incorporated by stirring at 1000 rpm for 1 minute.

A so-called roller test was carried out, the result of which is shown in the Tables below. The roller test firstly allows comparison to be made under conditions close to those in practice and secondly offers the possibility of reasonable differentiation of different formulations.

For the roller test, 40 grams of the test emulsion paint are spread using an open-pored foam roller onto a nonabsorbent test card having a total surface area of 500 cm². Prior to the application of the paint, the foam roller is wetted with water. It must be ensured that the additional amount of water introduced into the applied paint is always the same, so that the drying time of the paint always remains the same. The wet film addon is approximately 300 g/m². After 24 hours of drying time, the test cards are examined in accordance with the following criteria:

a) Macrofoam (number of bubbles per 100 cm²)
b) Microfoam (number of pinholes in comparison to photos of reference cards on a scale of 1 (very few or no pinholes) to 5 (very large number of pinholes))
c) Wetting defects (none, slight, severe)

The tests were repeated with emulsion paints which had been admixed with defoamer and kept at 50° C. for 6 weeks.
results for emulsion paint 1:

TABLE 4

| Formu- | Macrofoam | | Microfoam | | Wetting defects | |
|---|---|---|---|---|---|---|
| lation | Immediate | 6 weeks | Immediate | 6 weeks | immediate | 6 weeks |
| none | 76 | 78 | 5 | 5 | none | none |
| 1 | 1 | 3 | 1 | 1 | none | slight |
| 2 | 2 | 4 | 1 | 1 | none | slight |
| 3 | 0 | 1 | 1 | 1 | severe | severe |
| 4 | 61 | 70 | 3 | 3 | none | slight |
| 5 | 0 | 0 | 1 | 1 | none | none |
| 6 | 3 | 6 | 1 | 2 | none | slight |
| 7 | 3 | 4 | 1 | 2 | slight | slight |
| 8 | 1 | 1 | 1 | 1 | severe | severe |
| 9 | 62 | 69 | 2 | 3 | severe | severe |

TABLE 4-continued

| Formu- | Macrofoam | | Microfoam | | Wetting defects | |
|---|---|---|---|---|---|---|
| lation | Immediate | 6 weeks | Immediate | 6 weeks | immediate | 6 weeks |
| 10 | 0 | 1 | 1 | 1 | none | none |
| 11 | 0 | 0 | 1 | 1 | none | none |
| 12 | 3 | 4 | 1 | 2 | slight | slight |
| 13 | 48 | 31 | 2 | 2 | none | none |
| 14 | 0 | 0 | 1 | 1 | none | none |
| 15 | 0 | 1 | 1 | 1 | none | none |

Results for emulsion paint 2:

TABLE 5

| Formu- | Macrofoam | | Microfoam | | Wetting defects | |
|---|---|---|---|---|---|---|
| lation | Immediate | 6 weeks | immediate | 6 weeks | immediate | 6 weeks |
| none | 51 | 50 | 3 | 4 | none | none |
| 1 | 1 | 2 | 1 | 2 | none | slight |
| 2 | 1 | 3 | 1 | 1 | none | slight |
| 3 | 0 | 2 | 1 | 1 | severe | severe |
| 4 | 41 | 59 | 2 | 3 | slight | slight |
| 5 | 0 | 0 | 1 | 1 | none | none |
| 6 | 3 | 9 | 1 | 2 | none | slight |
| 7 | 4 | 5 | 1 | 2 | slight | slight |
| 8 | 0 | 1 | 1 | 1 | severe | severe |
| 9 | 48 | 54 | 2 | 3 | severe | severe |
| 10 | 1 | 1 | 1 | 1 | none | none |
| 11 | 0 | 1 | 1 | 1 | none | none |
| 12 | 6 | 11 | 2 | 2 | slight | slight |
| 13 | 27 | 27 | 2 | 2 | none | slight |
| 14 | 0 | 0 | 1 | 1 | none | none |
| 15 | 0 | 1 | 1 | 1 | none | none |

It is found that the polyoxyalkylene-polysiloxane block copolymers of the invention, which are present in the formulations 5, 10, 11, 14 and 15, offer outstanding possibilities for adapting their properties to the requirements of defoaming aqueous media. Surprisingly, it is possible to achieve particular effects which are not possible even with comparably insoluble conventional polyoxyalkylene-polysiloxane block copolymers.

The above description is intended to be illustrative and not limiting. Various changes and modifications in the embodiments described herein may occur to those skilled in the art. Those changes can be made without departing from the scope or spirit of the invention.

What is claimed is:

1. A method for defoaming aqueous media which comprises adding to the aqueous media a defoamer comprising a water-insoluble polyoxyalkylene-polysiloxane block copolymers of the general average formula (I)

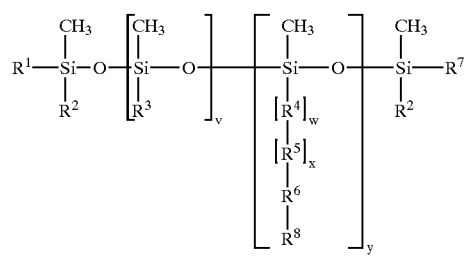

where
$R^1$ and/or $R^7$ are $R^2$ or $-[R^4]_w-[R^5]_x-R^6-R^8$,
$R^2$ and $R^3$ are identical or different alkyl radicals or are unsubstituted or substituted aryl radicals, $R^4$ is a divalent radical of the formula —O—, —NH—, —$NR^2$—, —S— or of the formula —[O—Si(CH$_3$)$_2$]$_u$—, where u is from 2 to 200, $R^5$ is identical or different alkylene radicals having 1 to 24 carbon atoms, or is —C$_n$H$_{2n-f}$R$^2_f$—O—C$_m$H$_{2m-g}$R$^2_g$—, where
f is from to 12,
g is from 0 to 12,
n is from 1 to 18,
m is from 1 to 18, $R^6$ is identical or different radicals of the general formula —O—(C$_2$H$_4$O)$_a$(CH$_2$—CH(CH$_3$)O)$_b$(CH$_2$—CR$^9$R$^{10}$O)$_c$—, where
$R^9$ and $R^{10}$ are a methyl radical, or $R^9$ is a hydrogen atom and $R^{10}$ is an ethyl radical, but where, taking into account all radicals $R^6$, the proportion of C$_2$H$_4$O groups among the total of all radicals $R^6$ does not exceed 40% by weight,
a is from 2 to 30,
b is from 2 to 50,
c is from 2 to 40, and
the sum (a+b+c) is from 6 to 100 and the sequence of the individual polyoxyalkylene segments —(C$_2$H$_4$O)$_a$— and —(CH$_2$—CH(CH$_3$)O)$_b$— and —(CH$_2$CR$^9$R$^{10}$O)$_c$— is either random or block or combination thereof, $R^8$ is a hydrogen, a substituted or unsubstituted alkyl radical, or an acyl radical,
v is from 3 to 200,
w is 0 or 1,
x is 0 or 1,
y is from 0 to 200,
and, if y is 0, $R^1$ and/or $R^7$ are/is —[R$^4$]$_w$—[R$^5$]$_x$—R$^6$—R$^8$.

2. The method according to claim 1, where
$R^1$ and/or $R^7$ are $R^2$ or —[R$^4$]$_w$—[R$^5$]$_x$—R$^6$—R$^8$,
$R^2$ and $R^3$ are identical or different alkyl radicals having 1 to 24 carbon atoms or are unsubstituted or substituted aryl radicals having up to 24 carbon atoms,
$R^4$ is a divalent radical of the formula —O—, —NH—, —NR$^2$— or —S— or of the formula —[O—Si(CH$_3$)$_2$]$_u$—, where
u is from 2 to 200,
$R^5$ is identical or different alkylene radicals having 1 to 24 carbon atoms, or is —C$_n$H$_{2n-f}$R$^2_f$—O—C$_m$H$_{2m-g}$R$^2_g$—, where
f is from 0 to 12,
g is from 0 to 12,
n is from 1 to 18,
m is from 1 to 18,
$R^6$ is identical or different radicals of the general formula —O—(C$_2$H$_4$O)$_a$(CH$_2$—CH(CH$_3$)O)$_b$(CH$_2$—CR$^9$R$^{10}$O)$_c$—, where
$R^9$ and $R^{10}$ are a methyl radical, or $R^9$ is a hydrogen atom and $R^{10}$ is an ethyl radical, but where, taking into account all radicals $R^6$, the proportion of C$_2$H$_4$O groups among the total of all radicals $R^6$ does not exceed 40% by weight,
a is from 2 to 30,
b is from 2 to 50,
c is from 2 to 40, and
the sum (a+b+c) is from 6 to 100 and the sequence of the individual polyoxyalkylene segments —(C$_2$H$_4$O)$_a$— and —(CH$_2$—CH(CH$_3$)O)$_b$— and —(CH$_2$CR$^9$R$^{10}$O)$_c$— is either random or block or combination thereof, $R^8$ is a hydrogen, a substituted or unsubstituted alkyl radical having from 1 to 6 carbon atoms, or an acyl radical,
v is from 3 to 200,
w is 0 or 1,
x is 0 or 1,
y is from 0 to 200,
and, if y is 0, $R^1$ and/or $R^7$ are/is —[R$^4$]$_w$—[R$^5$]$_x$—R$^6$—R$^8$.

3. The method according to claim 1, where at least 80% of the groups $R^2$ and $R^3$ are methyl groups,
$R^1$=$R^7$,
and the sum v+y is from 8 to 120.

4. The method according to claim 1, where the individual polyoxyalkylene units are arranged in blocks.

5. The method according to claim 1, where the poly(oxy-1,2-butandiyl) units are arranged in blocks directly adjacent to $R^8$.

6. The method according to claim 1, where
$R^1$=$R^7$ and is —CH$_3$,
$R^5$ is —(CH$_2$)$_3$—,
w is 0, and
x is 1.

7. The method according to claim 1, where
$R^1$=$R^7$ and is —(CH$_2$)$_3$—R$^6$—R$^8$,
$R^5$ is —(CH$_2$)$_3$—,
w is 0, and
x is 1.

8. The method according to claim 1, where
$R^1$=$R^7$ and is —(CH$_2$)$_3$—R$^6$—R$^8$ and
y is 0.

9. The method according to claim 1, where
$R^1$=$R^7$ and is —(CH$_2$)$_3$—R$^6$—R$^8$,
$R^4$ is —[O—Si(CH$_3$)$_2$]$_u$—,
$R^8$ is an unbranched alkyl radical,
u is from 2 to 6,
w is 1,
x is 0, and
y is from 1 to 6.

10. The method according to claim 1, where
$R^1$=$R^7$ and is —(CH$_2$)$_3$—R$^6$—R$^8$,
$R^8$ is an unbranched alkyl radical, and
y is 0.

11. The method according to claim 1, where c is from 2 to 5.

12. The method according to claim 1, wherein the defoamer further comprises an emulsifier.

13. The method according to claim 1, wherein the defoamer further comprises solids.

14. The method according to claim 1, where the defoamner is an aqueous emulsion.

15. A method for defoaming cooling lubricants, which comprises adding to the cooling lubricants a defoaming composition which comprises a water-insoluble polyoxyarylene block copolymer of the average general formula

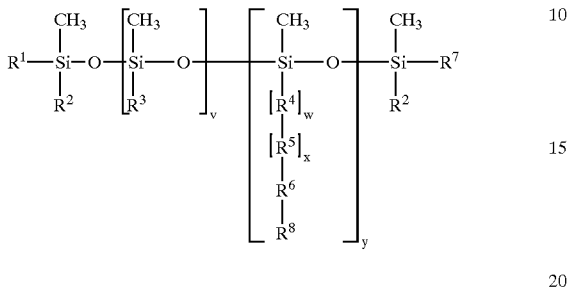

where $R^1$ and/or $R^7$ are $R^2$ or $-[R^4]_w-[R^5]_x-R^6-R^8$, $R^2$ and $R^3$ are identical or different alkyl radicals or are unsubstituted or substituted aryl radicals, $R^4$ is a divalent radical of the formula $-O-$, $-NH-$, $-NR^2-$, $-S-$ or of the formula $-[O-Si(CH_3)_2]_u-$, where u is from 2 to 200, $R^5$ is identical or different alkylene radicals having 1 to 24 carbon atoms, or is $-C_nH_{2n-f}R^2_f-O-C_mH_{2m-g}R^2_g-$, where, f is from 0 to 12, g is from 0 to 12, n is from 1 to 18, m is from 1 to 18, $R^6$ is identical or different radicals of the general formula $-O-(C_2H_4O)_a(CH_2-CH(CH_3)O)_b(CH_2-CR^9R^{10}O)_c-$, where $R^9$ and $R^{10}$ are a methyl radical, or $R^9$ is a hydrogen atom and $R^{10}$ is an ethyl radical, but where, taking into account all radicals $R^6$, the proportion of $C_2H_4O$ groups among the total of all radicals $R^6$ does not exceed 40% by weight, a is from 2 to 30, b is from 2 to 50, c is from 2 to 40, and the sum (a+b+c) is from 6 to 100 and the sequence of the individual polyoxyalkylene segments $-(C_2H_4O)_a-$ and $-(CH_2-CH(CH_3)O)_b-$ and $-(CH_2CR^9R^{10}O)_c-$ is either random or block or combination thereof, $R^8$ is a hydrogen, a substituted or unsubstituted alkyl radical or an acyl radical, v is from 3 to 200, w is 0 or 1, x is 0 or 1, y is from 0 to 200, and, if y is 0, $R^1$ and/or $R^7$ are/is $-[R^4]_w-[R^5]_x-R^6-R^8$.

16. A method for defoaming polymer dispersion, which comprises adding to the polymer dispersion a defoaming composition which comprises a water-insoluble polyoxyarylene block copolymer of the average general formula

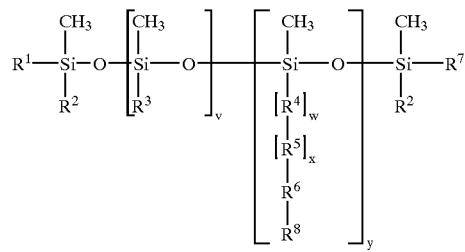

where $R^1$ and/or $R^7$ are $R^2$ or $-[R^4]_w-[R^5]_x-R^6-R^8$, $R^2$ and $R^3$ are identical or different alkyl radicals or are unsubstituted or substituted aryl radicals, $R^4$ is a divalent radical of the formula $-O-$, $-NH-$, $-NR^2-$, $-S-$ or of the formula $-[O-Si(CH_3)_2]_u-$, where u is from 2 to 200, $R^5$ is identical or different alkylene radicals having 1 to 24 carbon atoms, or is $-C_nH_{2n-f}R^2_f-O-C_mH_{2m-g}R^2_g-$, where, f is from 0 to 12, g is from 0 to 12, n is from 1 to 18, m is from 1 to 18, $R^6$ is identical or different radicals of the general formula $-O-(C_2H_4O)_a(CH_2-CH(CH_3)O)_b(CH_2-CR^9R^{10}O)_c-$, where $R^9$ and $R^{10}$ are a methyl radical, or $R^9$ is a hydrogen atom and $R^{10}$ is an ethyl radical, but where, taking into account all radicals $R^6$, the proportion of $C_2H_4O$ groups among the total of all radicals $R^6$ does not exceed 40% by weight, a is from 2 to 30, b is from 2 to 50, c is from 2 to 40, and the sum (a+b+c) is from 6 to 100 and the sequence of the individual polyoxyalkylene segments $-(C_2H_4O)_a-$ and $-(CH_2-CH(CH_3)O)_b-$ and $-(CH_2CR^9R^{10}O)_c-$ is either random or block or combination thereof, $R^8$ is a hydrogen, a substituted or unsubstituted alkyl radical or an acyl radical, v is from 3 to 200, w is 0 or 1, x is 0 or 1, y is from 0 to 200, and, if y is 0, $R^1$ and/or $R^7$ are/is $-[R^4]_w-[R^5]_x-R^6-R^8$.

17. A method for defoaming a coating material, which comprises adding to the coating material a defoaming composition which comprises a water-insoluble polyoxyarylene block copolymer of the average general formula

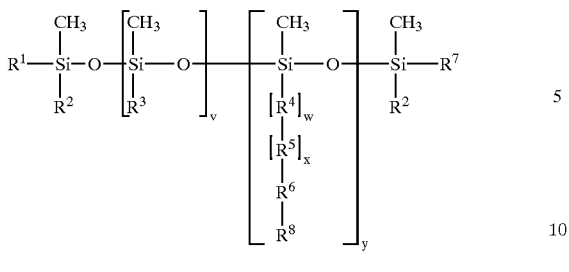

where
R$^1$ and/or R$^7$ are R$^2$ or —[R$^4$]$_w$—[R$^5$]$_x$—R$^6$—R$^8$,
R$^2$ and R$^3$ are identical or different alkyl radicals or are unsubstituted or substituted aryl radicals,
R$^4$ is a divalent radical of the formula —O—, —NH—, —NR$^2$—, —S— or of the formula

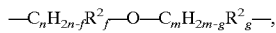

where u is from 2 to 200,
R$^5$ is identical or different alkylene radicals having 1 to 24 carbon atoms, or is

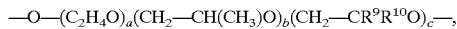

where,
f is from 0 to 12,
g is from 0 to 12,
n is from 1 to 18,
m is from 1 to 18,
R$^6$ is identical or different radicals of the general formula —O—(C$_2$H$_4$O)$_a$(CH$_2$—CH(CH$_3$)O)$_b$(CH$_2$—CR$^9$R$^{10}$O)$_c$—, where
R$^9$ and R$^{10}$ are a methyl radical, or R$^9$ is a hydrogen atom and R$^{10}$ is an ethyl radical, but where, taking into account all radicals R$^6$, the proportion of C$_2$H$_4$O groups among the total of all radicals R$^6$ does not exceed 40% by weight,
a is from 2 to 30,
b is from 2 to 50,
c is from 2 to 40, and
the sum (a+b+c) is from 6 to 100 and the sequence of the individual polyoxyalkylene segments —(C$_2$H$_4$O)$_a$— and —(CH$_2$—CH(CH$_3$)O)$_b$— and —(CH$_2$CR$^9$R$^{10}$O)$_c$— is either random or block or combination thereof,
R$^8$ is a hydrogen, a substituted or unsubstituted alkyl radical or an acyl radical,
v is from 3 to 200,
w is 0 or 1,
x is 0 or 1,
y is from 0 to 200,
and, if y is 0, R$^1$ and/or R$^7$ are/is —[R$^4$]$_w$—[R$^5$]$_x$—R$^6$—R$^8$.

18. A method for defoaming a printing ink which comprises adding to the printing ink a defoaming composition which comprises a water-insoluble polyoxyarylene block copolymer of the average general formula

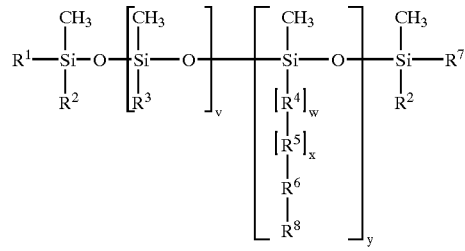

where
R$^1$ and/or R$^7$ are R$^2$ or —[R$^4$]$_w$—[R$^5$]$_x$—R$^6$—R$^8$,
R$^2$ and R$^3$ are identical or different alkyl radicals or are unsubstituted or substituted aryl radicals,
R$^4$ is a divalent radical of the formula —O—, —NH—, —NR$^2$—, —S— or of the formula

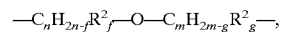

where u is from 2 to 200,
R$^5$ is identical or different alkylene radicals having 1 to 24 carbon atoms, or is

where,
f is from 0 to 12,
g is from 0 to 12,
n is from 1 to 18,
m is from 1 to 18,
R$^6$ is identical or different radicals of the general formula —O—(C$_2$H$_4$O)$_a$(CH$_2$—CH(CH$_3$)O)$_b$(CH$_2$—CR$^9$R$^{10}$O)$_c$—, where
R$^9$ and R$^{10}$ are a methyl radical, or R$^9$ is a hydrogen atom and R$^{10}$ is an ethyl radical, but where, taking into account all radicals R$^6$, the proportion of C$_2$H$_4$O groups among the total of all radicals R$^6$ does not exceed 40% by weight,
a is from 2 to 30,
b is from 2 to 50,
c is from 2 to 40, and
the sum (a+b+c) is from 6 to 100 and the sequence of the individual polyoxyalkylene segments —(C$_2$H$_4$O)$_a$— and —(CH$_2$—CH(CH$_3$)O)$_b$— and —(CH$_2$CR$^9$R$^{10}$O)$_c$— is either random or block or combination thereof,
R$^8$ is a hydrogen, a substituted or unsubstituted alkyl radical or an acyl radical,
v is from 3 to 200,
w is 0 or 1,
x is 0 or 1,
y is from 0 to 200,
and, if y is 0, R$^1$ and/or R$^7$ are/is —[R$^4$]$_w$—[R$^5$]$_x$—R$^6$—R$^8$.

* * * * *